United States Patent [19]
Bertram et al.

[11] Patent Number: 4,755,543
[45] Date of Patent: Jul. 5, 1988

[54] PHENOL-FORMALDEHYDE RESINS CONTAINING REDUCED QUANTITIES OF 2-FUNCTIONAL COMPONENTS AND EPOXY NOVOLAC RESINS PREPARED THEREFROM

[75] Inventors: James L. Bertram, Lake Jackson; Louis L. Walker, Clute; Avis L. McCrary, Lake Jackson; Fermin M. Cortez, Sweeny, all of Tex.

[73] Assignee: The Dow Chemical Company, Midland, Mich.

[21] Appl. No.: 16,025

[22] Filed: Feb. 18, 1987

Related U.S. Application Data

[63] Continuation-in-part of Ser. No. 690,702, Jan. 11, 1985, abandoned.

[30] Foreign Application Priority Data

Jan. 13, 1986 [BR] Brazil ............................ 8604531[U]

[51] Int. Cl.$^4$ ...................... C08L 62/10; C08L 63/02; C08K 7/06
[52] U.S. Cl. .................................. 523/222; 523/466; 523/468; 525/481; 525/507
[58] Field of Search ............... 523/222, 466, 468; 525/481, 507; 528/129, 165

[56] References Cited

U.S. PATENT DOCUMENTS 4,611,036 9/1986 Sekiguchi et al. ............... 525/481
4,649,188 3/1987 Bertram et al. ................... 528/165

OTHER PUBLICATIONS

Lee et al.; Handbook of Epoxy Resins; McGraw Hill Book Co.; 1967; pp. 2-10, 2-11, 11-14, 11-15.
Quatrex; Dow Chemical Co.; Form No. 296-598-85.

*Primary Examiner*—John C. Bleutge
*Assistant Examiner*—David W. Woodward

[57] ABSTRACT

Phenol-aldehyde novolac resins having reduced quantities of 2-functional material are prepared by removing all or part of the 2-functional material from this product resulting from reacting phenol with an aldehyde. Epoxy novolac resins prepared from the novolac resin containing less 2-functional product exhibit increased Tg values when cured.

14 Claims, No Drawings

PHENOL-FORMALDEHYDE RESINS CONTAINING REDUCED QUANTITIES OF 2-FUNCTIONAL COMPONENTS AND EPOXY NOVOLAC RESINS PREPARED THEREFROM

CROSS REFERENCE TO RELATED APPLICATION

This is a continuation-in-part of our copending application Ser. No. 690,702 filed Jan. 11, 1985, now abandoned.

BACKGROUND OF THE INVENTION

The present invention pertains to epoxy novolac resins, their novolac resin precursors and a process for preparation of said novolac resins.

High functional (average functionality of about 5–8) epoxy novolac resins have high Tg values when cured with sulfanilamide. However, they are very difficult to prepare due to the high viscosity of the novolac resin precursors. The present invention provides a method for preparing epoxy novolac resins having high Tg values when cured with typical epoxy curing agents such as, for example, methylenedianiline, diaminodiphenylsulfone, sulfanilamide and the like while having a relatively low melt viscosity.

SUMMARY OF THE INVENTION

One aspect of the present invention pertains to a novolac resin prepared from (1) an organic material having at least one aromatic hydroxyl group per molecule selected from the group consisting of (a) phenol and (b) a mixture of phenol and a substituted phenol wherein the substituent groups are hydroxyl, hydrocarbyl or hydrocarbyloxy groups having from 1 to about 9, preferably from 1 to about 4, carbon atoms, or a halogen and wherein more than about 50, suitably more than about 60, more suitably more than about 70 mole percent of the mixture is phenol and (2) an aldehyde; said novolac resin having an average functionality of from about 3 to about 6 and which contains less than about 18, preferably less than about 12.5, most preferably less than about 7 percent by weight 2-functional component; with the proviso that when 2-functional and 3-functional components are both present, they are present in a weight ratio of 2-functional component to 3-functional component of less than about 1.1:1, preferably less than about 0.75:1, most preferably less than about 0.5:1.

Another aspect of the present invention pertains to a novolac resin prepared from (1) an organic material having at least one aromatic hydroxyl group per molecule selected from the group consisting of (a) phenol and (b) a mixture of phenol and a substituted phenol wherein the substituent groups are hydroxyl, hydrocarbyl or hydrocarbyloxy groups having from 1 to about 9, preferably from 1 to about 4, carbon atoms, or a halogen and wherein more than about 50, suitably more than about 60, more suitably more than about 70, most suitably more than about 85 mole percent of the mixture is phenol and (2) an aldehyde, said novolac resin having an average functionality of from about 4 to about 12 and which contains less than about 14, preferably less than about 9, most preferably less than about 5, percent by weight of 2-functional component; with the proviso that when 2-functional and 3-functional components are both present, they are present in a weight ratio of 2-functional component to 3-functional component of less than about 1.1:1, preferably less than about 0.75:1, most preferably less than about 0.5:1.

Still another aspect of the present invention pertains to epoxy novolac resins resulting from dehydrohalogenating the reaction of an epihalohydrin with a novolac resin prepared from (1) an organic material having at least one aromatic hydroxyl group per molecule selected from the group consisting of (a) phenol and (b) a mixture of phenol and a substituted phenol wherein the substituent groups are hydroxyl, hydrocarbyl or hydrocarbyloxy groups having from 1 to about 9, preferably from 1 to about 4, carbon atoms, or a halogen and wherein more than about 50, suitably more than about 60, more suitably more than about 70, most suitably more than about 85 mole percent of the mixture is phenol and (2) an aldehyde; said novolac resin having an average aromatic functionality of from about 3 to about 6 and which contains less than about 18, preferably less than about 12.5, most preferably less than about 7 percent by weight 2-functional component; with the proviso that when 2-functional and 3-functional components are both present, they are present in a weight ratio of 2-functional component to 3-functional component of less than about 1.1:1, preferably less than about 0.75:1, most preferably less than about 0.5:1 which epoxy novolac resins have an average functionality of from about 3 to about 6 and which contain less than about 18, preferably less than about 12.5, most preferably less than about 7, percent by weight of 2-functional component; with the proviso that when 2-functional and 3-functional components are both present, they are present in a weight ratio of 2-functional component to 3-functional component of less than about 1.1:1, preferably less than about 0.75:1, most preferably less than about 0.5:1.

A further aspect of the present invention pertains to epoxy novolac resins resulting from dehydrohalogenating the reaction product of an epihalohydrin with a novolac resin prepared from (1) an organic material having at least one aromatic hydroxyl group per molecule selected from the group consisting of (a) phenol and (b) a mixture of phenol and a substituted phenol wherein the substituent groups are hydroxyl, hydrocarbyl or hydrocarbyloxy groups having from 1 to about 9, preferably from 1 to about 4, carbon atoms, or a halogen and wherein more than about 50, suitably more than about 60, more suitably more than about 70 mole percent of the mixture is phenol and (2) an aldehyde, said novolac resin having an average functionality of from about 4 to about 12 and which contains less than about 14, preferably less than about 9, most preferably less than about 5, percent by weight of 2-functional component; with the proviso that when 2-functional and 3-functional components are both present, they are present in a weight ratio of 2-functional component to 3-functional component of less than about 1.1:1, preferably less than about 0.75:1, most preferably less than about 0.5:1 having an average functionality of from about 4 to about 12 and which contain less than about 14, preferably less than about 9, most preferably less than about 5, percent by weight of 2-functional component; with the proviso that when 2-functional component and 3-functional component are both present, they are present in a weight ratio of 2-functional component to 3-functional component of less than about 1.1:1, preferably less than about 0.75:1, most preferably less than about 0.5:1.

Another aspect of the present invention pertains to the product which results from removing at least about 25, suitably at least about 35, more suitably at least about 50, most suitably at least about 70, weight percent of the 2-functional material from a novolac resin which results from reacting an aldehyde with an organic material having at least one aromatic hydroxyl group per molecule selected from the group consisting of (a) phenol and (b) a mixture of phenol and a substituted phenol wherein the substituent groups are hydroxyl, hydrocarbyl or hydrocarbyloxy groups having from 1 to about 9, preferably from 1 to about 4, carbon atoms, or a halogen and wherein more than about 50, suitably more than about 60, more suitably more than about 70, most suitably more than about 85 mole percent of the mixture is phenol.

The present invention also pertains to curing an epoxy resin having an average of more than one vicinal epoxy group per molecule and a curing quantity of the aforementioned novolac resins.

DETAILED DESCRIPTION OF THE PRESENT INVENTION

By the expression "2-functional component" as employed herein it is meant that portion of the novolac resin or epoxy novolac resin wherein n has a value of zero.

By the expression "3-functional component" as employed herein, it is meant that portion of the novolac resin or epoxy novolac resin wherein n has a value of 1.

By the expression "average functionality" as employed herein, it means the average number of aromatic rings containing ydroxyl groups or epoxy groups attached thereto as appropriate per molecule.

The novolac resins of the present invention can be represented by the formula

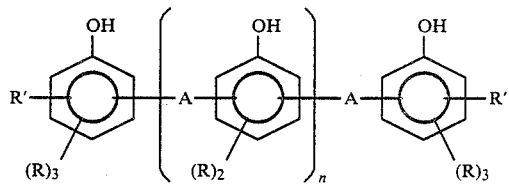

wherein each A is independently a divalent hydrocarbon group or a divalent hydrocarbon group substituted with any inert substituent group such as, for example, a halogen such as fluorine or chlorine or bromine, said hydrocarbon having from 1 to about 14, preferably from 1 to about 8, carbon atoms; each R is independently hydrogen, a halogen atom, or a hydrocarbon group having from about 1 to about 9, preferably from about 1 to about 4 carbon atoms; each R' is independently hydrogen, a hydroxyl group, a halogen atom, or a hydrocarbon group having from about 1 to about 9, preferably from about 1 to about 4 carbon atoms; and n has an average value of from about 1 to about 10.

Suitable hydroxyl-containing aromatic materials which can be employed herein are represented by the formula

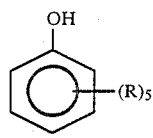

wherein each R is independently hydrogen, a halogen atom, a hydroxyl group or a hydrocarbon group having from about 1 to about 9, preferably from about 1 to about 4 carbon atoms.

Particularly suitable materials include, for example, phenol, methylphenol, ethylphenol, propylphenol, butylphenol, nonylphenol, bromophenol, chlorophenol, resorcinol, hydroquinone, catechol, mixtures therof and the like.

Suitable aldehydes which can be employed herein include any aliphatic, cycloaliphatic or aromatic aldehyde having from 1 to about 14, preferably from 1 to about 8, carbon atoms. Particularly suitable such aldehydes include, for example, formaldehyde, acetaldehyde, propionaldehyde, butyraldehyde, benzaldehyde, mixtures thereof and the like.

Suitable acid catalysts which can be employed herein include, for example, oxalic acid, p-toluene sulfonic acid, benzene sulfonic acid, hydrochloric acid, sulfuric acid, mixtures thereof and the like.

The reaction between the aldehyde and the monohydric aromatic material can be carried out at any suitable temperature such as, for example, from about 90° C. to about 150° C., preferably from about 100° C. to about 120° C. The reaction is continued until the reaction is substantially complete, usually from about 0.5 to about 6 hours (1800–21600-s), preferably from about 1 to about 2 hours (3600–7200 s).

The water extraction step of the present invention can be multi-stage batch extractions or it can be by continuous co-current or counter-current extraction.

The water extraction is usually conducted at a temperature of from about 60° C. to about 180° C., preferably from about 90° C. to about 150° C. and the number of extractions or the contact time is that which is sufficient to produce the desired result, i.e. produce a product containing about 25, suitably about 50, more suitably more than about 70, and most suitably more than about 90 percent by weight less of two functional product than was originally present in the novolc resin prior to water extraction or other suitable means for removing 2-functional product.

Other suitable methods for removing portions of the 2-functional component such as vacuum distillation can also be employed.

If desired, the efficiency of the water extraction can be enhanced by employing minor amounts of one or more organic solvents with the water. Suitable such organic solvents include, for example, ketones, alcohols and glycol ethers. Particularly suitable organic solvents include, for example, acetone, methyl ethyl ketone, methyl isobutyl ketone, methanol, ethanol, isopropanol, amyl alcohol, monomethyl ether of dipropylene glycol, mixtures thereof and the like.

Also, if desired, the two functional novolac resin can be removed from the aqueous extract by extraction with a suitable organic solvent such as those mentioned above which are not miscible with water, with metyl isobutyl ketone being particularly suitable.

The epoxy novolac resins of the present invention are prepared in the usual manner employing the novolac resin having about 25, preferably about 50, percent by weight less of two functional product than was originally present in the original novolac resin prior to water extraction. The novolac resin is reacted with an epihalohydrin and then subjected to dehydrohalogenation with a basic-acting material such as, for example, sodium hydroxide, potassium hydroxide, sodium carbonate, combinations thereof and the like.

The epoxy novolac resins of the present invention can be represented by the formula

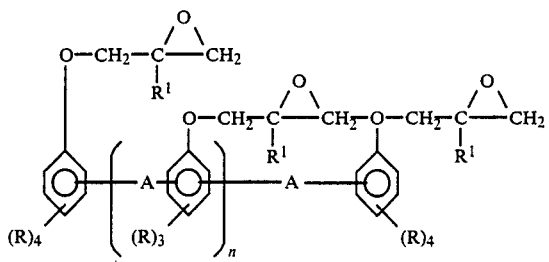

wherein A, R and n are as previously defined and $R^1$ is hydrogen or an alkyl group having from 1 to about 4 carbon atoms.

Suitable epoxy resins which can be cured with the novolac resins of the present invention include, for example, the glycidyl ethers of polyhydric phenols, bisphenols, novolac resins, aliphatic polyols, nitrogen-containing compounds and the like. These and other suitable epoxy resins are disclosed in *Handbook of Epoxy Resins* by Lee and Neville, McGraw-Hill, 1967, particularly Chapters 2 and 3, all of which Handbook is incorporated herein by reference. Any material having an average of more than one epoxy group per molecule can be cured with the novolac resins of the present invention.

In curing epoxy resins with the novolac resins of the present invention, the usual quantity to be employed is that which provides a hydroxyl:epoxy ratio of from about 0.8:1 to about 1.1:1, preferably from about 0.9:1 to about 1:1. In some instances, a suitable curing quantity may be outside these enumerated quantities.

The epoxy novolac resins of the present invention can be cured with any of the well known curing agents for epoxy reins, many of which are enumerated in the aforementioned *Handbook of Epoxy Resins*, which is incorporated herein by reference. Such curing agents include, for example, primary and secondary amines, polycarboxyl acids and anhydrides thereof, biguanides, guanidines, sulfonamides, materials containing a plurality of phenolic hydroxyl groups, urea-aldehyde resins, melamine-aldehyde resins, polyamide resins, combinations thereof and the like. Particularly suitable curing agents include, for example, ethylenediamine, diethylenetriamine, triethylenediamine, tetraethylenepentamine, methylene dianiline, phenol-formaldehyde novolac resins, bisphenol A, sulfanilamide, diaminodiphenylsulfone, dicyandiamide, combinations thereof and the like.

The epoxy novolac resins of the present invention can be employed in the preparation of composites, moldings, castings, coatings, adhesives, encapsulants, laminates and the like.

The following examples are illustrative of the present invention but are not to be construed as to limiting the scope thereof in any manner.

TEST METHODS

The following test methods were employed in the Examples.

WEIGHT

The molecular weight was determined using standard gel permeation chromatography (GPC) methods using polystyrene standards for molecular weight calibration.

GLASS TRANSITION TEMPERATURE

The Glass transition temperature, (Tg), was determined using a DuPont 1090 analyzer with a model 912 differential scanning calorimeter (DSC) For Tg up to about 250° C. For Tg's>250° C., a DuPont model 943 thermal mechanical analyzer (TMA) was employed.

SOFTENING POINTS

The softening points were determined employing a Mettler model FP-53 softening point apparatus (MSP).

FRACTURE TOUGHNESS MEASUREMENT ($G_{1C}$)

The method for measuring $G_{1C}$ (fracture toughness or "critical strain energy release rate") is an adaptation of ASTM E-399 for plastics materials from the original usage with metals. The compact tension test is now widespread in usage and is described in the *J. Mater. Sci.*, Vol. 16, 2657, 1981. An individual test piece is cut to an approximate 1" (25.4 mm) square from a flat casting usually of ⅛" (3.175 mm) thickness. A dovetail notch is cut into one edge, centered, about ¼" (6.25 mm) in depth. Next, a razor blade is inserted into this notch and tapped to produce a precrack. Two holes are then drilled adjacent to the dovetail as indicated in ASTM E-399, allowing the test piece to be pinned into position in the Instron test machine. Extension of the sample now allows the force required to propagate opening of the precrack to be measured, using a test speed of 0.02 inch/minute (0.0085 mm/sec.). This force is used in the equation given in ASTM E-399, along with the required sample dimensions and actual precrack length, to calculate a "stress intensification factor" KQ. This is then combined with the tensile modulus (in those instances where the tensile modulus was not measured, a value of 300,000 psi was used) and Poisson's ratio for the material to give the value for $G_{1C}$, usually reported in ergs/cm$^2 \times 10^6$. A scale comparing typical values for $G_{1C}$ for various plastics and metals is given in the reference Lee, L. H., "Physicochemical Aspects of Polymer Surfaces", K. L. Mittal, ed. Plenum Press, New York, N.Y., 1983.

EXAMPLE 1

A. Preparation of Phenol-Formaldehyde Novolac Resin

A novolac resin was prepared by reacting 2.89 parts phenol, 1.0 part of formalin, 37% aqueous formaldehyde, and 0.0018 parts oxalic acid to produce a resin with a Mettler softening point of 74.1, melt viscosity at 150° C. of 100 cps. Analysis by gel permeation chromatography (GPC) showed the product to have a wt. average M.W. of 813, a no. average M.W. of 583, with a polydispersity of 1.40. The product contained 21.26% by weight of 2-functional components and 17.10% by weight of 3-functional components for a ratio of 2-functional to 3-functional components of 1.24:1.

B. Removal of 2-Functional Product

The above prepared phenol-formaldehyde novolac resin was repeatedly extracted with boiling water until the 2-functional content was less than about 1% by weight.

C. Preparation of Epoxy Novolac Resin

The product from Example 1-B, 206 grams, was dissolved in 925 grams of epichlorohydrin, 484.7 grams of isopropanol and 78.6 grams of water. This mixture was then heated to 70° C. and 360 grams of 20% aqueous sodium hydroxide was added during approximately 45 minutes (2700 s). The reaction mixture was digested at this temperature for an additional 15 minutes (900 s). Then the aqueous phase separated and was discarded. Twenty percent aqueous sodium hydroxide, 160 grams, was added to the mixture at 70° C. during approximately 20-30 minutes (1200–1800 s). The reaction was digested for an additional 15-20 minutes (900–1200 s) at 70° C., then cooled. The aqueous layer was separated and the organic layer was repeatedly washed with water until free of salt and sodium hydroxide. Additional epichlorohydrin, 462 grams, was added during the washing steps to aid separation. The product was obtained by removing the excess epichlorohydrin and solvent via vacuum distillation. The semi-solid epoxy resin product had an epoxy content of 23.3%, an epoxide equivalent weight of 184.5 and a hydrolyzable chloride content of 51 ppm.

D. Curing of Epoxy Novolac Resin

The epoxy resin from Example (1-C), 35.0 grams, was heated to about 150° C., and 6.93 grams of sulfanilamide added. The mixture was stirred until homogenous, then poured into an aluminum mold, ⅛×5×4 inches (0.3175×12.7×10.16 cm), and cured as follows: 16 hours (57600 s) at 150° C., followed by 2 hours (7200 s) at 200° C., and an additional 2 hours (7200 s) at 225° C. The casting was then cooled and analyzed for Tg by DSC. The product gave an inflection at 273° C. with the onset of an exotherm indicating an incomplete cure. After post curing for 2 hours (7200 s) at 260° C., the Tg was >300° C.

E. Curing of Epoxy Novolac Resin

Example (1-D) was exactly repeated, with the exception that 0.1 ml of a 70% solution of butyl triphenyl phosphonium acetate.acetic acid complex in methanol was added along with the sulfanilamide. The cured casting had the following properties: Tg of >300° C., $G_{1C}$ of 0.11 kJ/m$^2$.

F. Curing of Commercially Available Epoxy Novolac Resin. (For Comparative Purposes)

A 3.6 average functionality epoxy novolac resin (available from The Dow Chemical Company as D.E.N. ™ 438 epoxy resin, epoxide equivalent weight 179.7, a wt. avg. M.W. of 1,123, a no. avg. M.W. of 618 with a polydispersity of 1.7 and containing about 20.6 percent by weight of 2-functional product with a weight ratio of 2-functional to 3-functional components of 1.39:1), 35.0 grams, was heated to about 150° C. and mixed with 7.12 grams sulfanilamide exactly as described in Example (1-D). The cured resin had the following properties: Tg of 172° C. and $G_{1C}$ of 0.15 kJ/m$^2$

G. Curing of a Commercially Available Epoxy Novolac Resin. (For Comparative Purposes)

Example (1-F) was exactly repeated, except the catalyst as described in Example (1-E) was also added. The cured resin had the following properties: Tg of 209.7° C., $G_{1C}$ of 0.21 kJ/m$^2$ and a notched Izod Impact of 0.18 ft. lbs. per inch of notch.

EXAMPLE 2

A. Preparation of Phenol-Formaldehyde Novolac Resin

A portion of the novolac resin prepared in Example 1-A was employed.

B. Removal of 2-Functional Product

The above prepared novolac resin was continuously extracted with 99° C. water until the 2-functional content was 14.1% by wt. as measured by GPC. The 3-functional content was 17.21% by wt. for a ratio of 2-functional to 3-functional material of 0.82:1. The wt. avg. M.W. was 922, the no. avg. M.w. was 654, and the polydispersity was 1.40. The solid product had a Mettler softening point of 84.3° C., and a melt viscosity at 150° C. of 165 cps (0.176 Pa.s).

C. Preparation of Epoxy Novolac

Using the procedure as described in Example 1-C, a portion of the above extracted novolac resin prepared in Example 2-B, (206 grams) was dissolved with 925 grams of epichlorohydrin in 498 grams of isopropanol and 80.4 grams of water. This mixture was then heated to 70° C. and 360 grams of 20% aqueous sodium hydroxide was added during approximately 45 minutes (2700 s). After separating the aqueous phase, an additional 32 grams of sodium hydroxide dissolved in 128 grams of water was added in the second step. The epoxy product had an epoxide equivalent weight of 179.4, a hydrolyzable chloride content of 768 ppm, a Mettler softening point of 53.5° C., and a melt viscosity of 100 cps (0.1Pa.s ) at 150° C. The wt. avg. M.W. was 1,106, no. avg. M.W. was 719, and the polydispersity was 1.54. The 2-functional and 3-functional content was 10.50% and 12.65% by weight, respectively to give a ratio of 0.83:1.

D. Curing of Epoxy Novolac Resin

A portion of the epoxy resin prepared in Example 2-C, 10.0 grams, was mixed at 150° C. with 2.76 grams of methylene dianiline till homogeneous, then cured via the following schedule: 2 hours (7200 s) at 150° C., 1 hour (3600 s) at 200° C., 1 hour (3600 s) at 250° C., and ¾ hour (2700 s) at 270° C. The glass transition temperature (Tg) was determined by expansion using a DuPont model 943 thermal mechanical analyzer (TMA) to be 306.0° C.

E. Curing of a Commercially Available Epoxy Novolac with Methylenedianiline (For comparative purposes)

The resin described in Example 1-F, 10.0 grams was cured as described in Example 2-D. The Tg, as measured by TMA, was 184.3° C.

F. Solvent Extraction of a Commercially Available Epoxy Novolac Resin (For Comparative Purposes)

A portion of the resin described in Example 1-F was treated with xylene exactly as described in U.S. Pat. No. 3,928,288, Example VIII. The product had an epoxide equivalent weight of 204, a wt. average molecular weight of 2,043, a no. average molecular weight of 1,106, with a polydispersity of 1.85, a 2-functional content of 6.23, with a ratio of 2-functional to 3-functional content of 1.12:1.0.

G. Cure of Epoxy Novolac (For Comparative Purposes).

A portion of the resin from Example 2-F, 10.0 grams, was reacted with 2.42 grams of methylenedianiline exactly as described in Example 2-D. The cured resin had a Tg as measured by TMA of 312.3° C.

H. Curing of an Epoxy Novolac Resin with a Phenolic Novolac (For Comparative Purposes.

A portion of the epoxy novolac resin described in Example 1-F, 10.0 grams, was mixed at 177° C. with 5.76 grams of the phenolic novolac resin described in Example 1-A and 0.12 gram of a 70 wt. percent solution of tetrabutylphosphonium acetateacetic acid complex in methanol. The mixture was cured 3 hours (10800 s) at 177° C., 2 hours (7200 s) at 200° C., and 1 hour (3600 s) at 225° C. The cured product had a Tg, as measured by DSC, of 154.4° C.

I. Curing of an Epoxy Novolac Resin with a Phenolic Novolac

A portion of the epoxy novolac resin described in Example 1-F, 10 grams, was mixed with 5.76 grams of the phenolic resin described in Example 2-B and treated exactly as described in Example 2-H. The product had a Tg, as measured by DSC, of 153.4° C.

EXAMPLE 3

A. Preparation of Phenol-Formaldehyde Novolac Resin

A portion of the novolac resin from Example 1-A was employed.

B. Removal of 2-Functional Product

The above prepared novolac resin was continuously extracted with 99° C. water until the 2-functional content was 3.0% by wt. as determined by GPC analysis. The resin had a wt. avg. M.W. of 1,045 and a no. avg. M.W. of 797, and a polydispersity of 1.31. The 2-functional and 3-functional content was 3% and 13.6% by weight, respectively, for a ratio of 0.22:1. The solid resin had a Mettler softening point of 103.4° C., and a melt viscosity at 150° C. of 570 cps.

C. Preparation of Epoxy Novolac

Using the exact same procedure and amounts as described in Example 2-C, 206 grams of the above extracted novolac resin was reacted with epichlorohydrin to yield an epoxy resin with the following analysis: epoxide equivalent weight 182.5, hydrolyzable chloride 581 ppm, Mettler softening point 66.4°, and a melt viscosity of 210 cps (0.21 Pa.s) at 150° C. The wt. avg. M.W. was 1,267, no. avg. M.W. 876 and the polydispersity was 1.45.

D. Curing of Epoxy Novolac Resin

A portion of the resin prepared in Example 2-C, 30.0 grams, was mixed with 11.17 grams of tetrabromobisphenol A, and 4.50 grams of sulfanilamide at 150° C. until homogeneous, then cured 16 hours (57600 s) at 150° C. followed by 2 hours (7200 s) at 200° C. The Tg as measured by DSC was 215.8° C. with exotherm. The $G_{1C}$ value was 0.14 and the Izod Impact was 0.27 ft. lb. per inch of notch.

EXAMPLE 4

A. Preparation of Phenol-Formaldehyde Novolac Resin

A portion of the novolac resin from Example 1-A was employed.

B. Removal of 2-Functional Product

The above prepared novolac resin was continuously extracted with 99° C. water until the 2-functional content was 0.36% by weight as measured by high performance liquid chromatography (HPLC). The solid product had a melt viscosity of 3,200 cps (3.2 Pa.s) at 150° C. and a Mettler softening point of 117.5° C. The wt. avg. M.W. was 1,209, no. avg. M.W. 985, and the polydispersity was 1.23. The weight ratio of 2-functional components to 3-functional components was less than 0.25:1.

C. Curing of an Epoxy Novolac Resin with a Phenolic Novolac Resin

The procedure of Example 2-I was repeated employing the phenolic novolac resin prepared in Example 4-B. The cured product had a Tg of 188.5° C.

EXAMPLE 5

A. Preparation of Phenol-Formaldehyde Novolac Resin

A portion of the novolac resin from Example 1-A was employed.

B. Removal of 2-Functional Product

The procedure of Example 4-B was followed, until the 2-functional content, as measured by GPC, was less than 0.1% by weight. The friable solid product had a wt. avg. M.W. of 1,229, and a no. avg. M.W. of 1,046, with a polydispersity of 1.18. The weight ratio of 2-functional to 3-functional components was less than 0.25:1.

C. Preparation of Epoxy Novolac

Using the procedure of Example 1-C, a portion of the novolac from B above, 175 grams was reacted with 778.25 grams of epichlorohydrin in 419.06 grams of isopropanol and 67.67 grams of water using 437.9 grams of 20% aqueous sodium hydroxide. The product was a non-sintering, friable solid with a MSP of 79.7° C., and epoxide equivalent weight of 182.4. The wt. avg. M.W. was 1,539, no. avg. M.W. 1,185, with a polymer dispersity of 1.30 as determined by GPC. The weight ratio of 2-functional to 3-functional components was less than 0.25:1.

D. Curing of Epoxy Novolac Resin

The procedure of Example 2-D was followed, using 10.0 grams of the resin from Example 5-C and 2.71 grams of methylenedianiline. The cured product had a Tg as measured by TMA of >360° C.

EXAMPLE 6

A. Preparation of Phenol-Formaldehyde Novolac

A portion of the novolac resin from Example 1-A was employed.

B. Removal of 2-Functional Product

The above prepared novolac resin was continuously extracted with 99° C. water until the 2-functional content was 2.55% by wt. as determined by GPC. The resin had a wt. avg. molecular weight of 1,038, a no. avg. M.W. of 814, with a polydispersity of 1.28. The weight ratio of 2-functional to 3-functional was less than 0.5:1.

C. Preparation of Epoxy Novolac

Using the same procedure as described in Example 1-C, 425.9 grams of the above novolac was reacted with 1894.0 grams of epichlorohydrin in 1019.8 grams of isopropanol using 1065.2 grams of 20% aqueous sodium hydroxide. The epoxy novolac had an epoxide equivalent weight of 177.9. The wt. avg. M.W. was 1309, no. avg. M.W. 862, and the polydispersity was 1.46. The 2-functional content was 2.29% vs. 9.9% for the 3-functional product to give a weight ratio of 2-functional to 3-functional of 0.23:1.

D. Curing of Epoxy Novolac

A portion of the epoxy novolac resin prepared in Example 6-C, 10.0 grams was reacted with 2.78 grams of methylenedianiline exactly as described in Example 2-D. The cured product had a Tg of 356.9° C. as measured by TMA.

E. Curing of Epoxy Novolac

A portion of the epoxy resin prepared in Example 6-C, 34.3 grams was mixed at 150° C. with 10.16 gram of diaminodiphenylsulfone until homogeneous, then degassed in a vacuum oven and poured into a ⅛ inch (0.3175 cm) aluminum mold. The casting was cured for 2 hours (7200 s) at 150° C., 1 hour (3600 s) at 200° C., 1 hour (3600 s) at 250° C. and ¾ hour (2700 s) at 270° C. The casting had the following properties: Tg>360° C., Flexural Strength 15,100 psi (104 MPa) and a Flexural Modulus of 533,000 psi (3672 MPa).

EXAMPLE 7

A. Preparation of Phenol-Formaldehyde Novolac Resin

A glass reactor equipped with a stirrer, reflux condenser, addition funnel, and a device for controlling temperature was charged with 550 grams (5.85 moles) of phenol and 2.75 grams (0.03 mole) of oxalic acid. This mixture was heated to 110° C., and 298.8 grams (3.68 moles) of formalin, 37% aqueous formaldehyde, was slowly added during approximately 60 minutes (3600 s). The reaction mixture was allowed to reflux during the formalin addition, and for about 60 minutes (3600 s) thereafter. A vacuum was then applied, and the excess phenol and water were removed by vacuum distillation at a final temperature of 180° C. The solid novolac resin had a Mettler softening point of 87.9° C., analysis by gel permeation chromatography (GPC) showed the product to have a wt. avg. M.W. of 1,044, a no. avg. M.W. of 700, with a polydispersity of 1.49. The product contained 16.3% 2-functional components, and the ratio of 2-functional to 3-functional was 1.2 to 1.0.

B. Removal of 2-Functional Product

The above prepared novolac resin was continuously extracted with 99° C. water until the 2-functional content was less than 0.5% by weight as measured by GPC. The weight ratio of 2-functional to 3-functional components was less than 0.5:1.

C. Preparation of Epoxy Novolac Resin

Using the exact same procedure as described in Example 1-C, 307 grams of the product from Example 5-B was reacted with 767.0 grams of 20% aqueous caustic in 1365.3 grams of epichlorohydrin, 735.1 grams of isopropanol and 118.7 grams of water. The product had a MSP of 81.3° C., a melt viscosity of 589 cps (0.589 pa.s) measured at 150° C., and an epoxide equivalent weight of 186.1. The ratio of 2-functional to 3-functional components was less than 0.5:1.

EXAMPLE 8

A. Preparation of Phenol-Formaldehyde Novolac Resin

Using the procedure as described in Example 7-A. 15506.6 grams (16.03 moles) of phenol was reacted wit 831.56 grams (10.26 moles) of formaline, 37% aqueous formaldeyde, using 7.53 grams (0.084 moles) of oxalic acid. The solid product had a Mettler softening point of 90.7° C. The 2-functional content was 15.27 as measured by GPC. The wt. avg. M.w. was 1,098, no. avg. M.W. 714 with a polydispersity of 1.54. The produce contained 15.2% 2-functional components, and a 3-functional component content of 12.67% for a ratio of 2-functional to 3-functional components of 1.2 to 1.0.

B. Removal of 2-Functional Product

A portion of the above prepared product was continuously extracted with about 99° C. water until the 2-functional content was 4.26% by weight as measured by GPC. The solid product had a Mettler softening point of 108.9° C. The wt. avg. M.W. was 1,263, no. avg. M.W. 895, with a polydispersity of 1.41. The ratio of 2-functional to 3-functional components was 0.40 to 1.0.

C. Removal of 2-Functional Product

A second portion of the novolac resin prepared in Example 8-A was continuously extracted with water until the 2-functional content was less than 0.5% by weight as measured by GPC. The Mettler softening point was 128° C. The wt. avg. M.W. was 1,446, no. avg. M.W. 1,138, and the polydispersity was 1.27. The ratio of 2-functional to 3-functional components was less than 0.25 to 1.0.

D. Preparation of Epoxy Novolac

A portion of the resin prepared in Example 8-B, 402.5 grams was reacted with 1789.9 grams of epichlorohydrin in 963.8 grams of isopropanol and 155.6 grams of water using 1006.4 grams of 20% aqueous caustic as described in Example 1-C. The product had an epoxide equivalent weight of 185. The wt. avg. M.W. was 1,481, the no. avg. M.W. was 935, with a polydispersity of 1.58. The 2-functional content was 3.81%. The weight ratio of 2-functional to 3-functional components was less than 0.42:1.

E. Preparation of Epoxy Novolac

A portion of the resin prepared in Example 8-C, 385.3 grams was reacted with 1713.6 grams of epichlorohydrin in 922.7 grams of isopropanol and 149 grams of water using 964.6 grams of 20% aqueous caustic as described in Example 1-C. The product was a friable, non-sintering solid with a MSP of 85° C., and an epoxide content of 23%. The wt. avg. M.W. was 1,719, no. avg. M.W. 1,234, with a polydispersity of 1.39. The 2-functional content was less than 0.5%. The ratio of 2-functional to 3-functional components was less than 0.25 to 1.0.

EXAMPLE 9

A. Preparation of Phenol-formaldehyde Novolac Resin

Using the procedure described in Example 7-A, 3000 grams (31.88 moles) of phenol was reacted with 1655.96 grams (20.4 moles) of formalin (37% aqueous formaldehyde) using 15.0 grams (0.167 mole) of oxalic acid. The solid resin obtained had a Mettler softening point of 92.7, and a metl viscosity of 380 cps at 150° C. By GPC analysis, the wt. avg. M.W. was 1,168, no. avg. M.w. 753, with a polydispersity of 1.55. The resin contained 16.67% 2-functional product. The weight ratio of 2-functional to 3-functional components was 1.24:1.

B. Removal of 2-Functional Product

A portion of the above product was continuously extracted with approximately 99° C. water until the 2-functional content was 0.36 by weight as measured by HPLC. By GPC analysis, the wt. avg. M.W. was 1,452, no. avg. M.W. 1,123, with a polydispersity of 1.29. The ratio of 2-functional to 3-functional components was less than 0.25:1.

C. Removal of 2-Functional Product

A second portion of the novolac resin prepared in Example 9-A was continuously extracted with hot water until the 2-functional content was 0.73% by wt. as measured by HPLC. The resin had a wt. avg. M.W. of 1,427, a no. avg. M.w. of 1,090, with a polydispersity of 1.31. The product had a weight ratio of 2-functional to 3-functional components of 0.25:1.

D. Preparation of the Novolac

A portion of the novolac resin from Example 9-B, 425 grams was reacted with epichlorohydrin using the exact same ratios of reactants and conditions as described in Example 8-B. The product was a non-sintering, friable solid with a MSP of 86.0° C. The melt viscosity was 850 cps measured at 150° C. The product had an epoxide equivalent weight of 184.0. The wt. avg. M.W. was 1775, no. avg. M.W. 1203, with a polydispersity of 1.48. The ratio of 2-functional to 3-functional content was less than 0.25 to 1.0.

E. Preparation of Epoxy Novolac

A portion of the novolac resin from Example 9-C, 425.0 grams was reacted exactly as described in Example 9-D to give a friable solid resin with an epoxide equivalent weight of 184.6. The wt. avg. M.W. was 1,789, no. avg. M.W. 1,187, with a polydispersity of 1.41. The 2-functional content was 0.73% by weight and the weight ratio of 2-functional to 3-functional content was less than 0.25:1.

F. Curing of Epoxy Novolac Resin

A portion of the resin from example 9-E, 35.0 grams, was mixted at 150°-160° C. with 6.93 grams of sulfanilamide and 0.2 ml of a 70 wt. percent solution of ethyltriphenylphosphonium acetate acetic acid complex in methanol. After curing for 16 hours (57,600 s) at 150° C., 2 hours (7200 s) at 200° C., and 2 hours (7200 s) at 225° C., the product had a Tg greater than 255° C.

G. Curing of an Epoxy Novolac Resin with a Novolac Resin

A portion of the resin from Example 9-E, 30.0 grams, was mixed at 150°-160° C. with 16.9 grams of the phenolic novolac from Example 9-C, and 0.075 grams of 2-methylimidazole. The mixture was cured 16 hours (57,600 s) at 150° C., followed by 2 hours (7200 s) at 200° C. and 2 hours (7200 s) at 225° C. The cured product had a Tg greater than 240° C. as measured by DSC.

H. Curing of Epoxy Novolac Resin

A portion of the resin from Example 9-E, 10.0 grams, was mixed with 2.68 grams of methylenedianiline at 150° C. and treated exactly as described in Example 2-D. The Tg via TMA was 311.8° C.

I. Preparation of Epoxy Novolac Resin

A portion of the resin from Example 9-A, 104 grams, was dissolved in 462.5 grams of epichlorohydrin and 2.3 grams of 60% aqueous benzyltrimethylammonium chloride solution was added. This solution was stirred under a nitrogen atmosphere for 72 hours (259,200 s) at 70° C., then cooled to 20° C., and 312.5 grams of a 16% solution of sodium hydroxide/9% sodium carbonate was added and stirred at 20° C. for 90 minutes (5400 s). The aqueous layer separated, and an additional 312.5 grams of 16% sodium hydroxide/9% sodium carbonate solution was added and stirred for 30 minutes (1800 s) at 20° C. The aqueous layer was separated, and the organic layer washed with water until free of salt and caustic. The excess epichlorohydrin was then removed via vacuum distillation at 150° C. The product had an epoxide content of 24.9%. The 2-functional content was 13.4%. The wt. avg. M.W. was 1,531 and the no. avg. M.W. was 729, with a polydispersity of 1.71. The ratio of 2-functional to 3-functional components was 1.30:1.

J. Solvent Extraction of Epoxy Novolac Resin (For Comparative Purposes)

The procedure described in U.S. Pat. No. 3,928,288 was duplicated using 80.0 grams of the resin prepared in Example 9-I.

K. Curing of an Epoxy Novolac Resin with a Phenolic Novolac Resin (For Comparative Purposes)

The procedure described in Example 2-I was repeated using the phenolic novolac resin described in Example 9-B. The cured product had a Tg of 195.4° C.

L. Curing of Epoxy Novolac Resin (For Comparative Purposes)

A portion of the resin from Example 9-I, 10.0 grams, was reacted with 2.86 grams of methylenedianiline exactly as described in Example 2-D. The cured resin had a Tg of 284.2 as measured by TMA.

M. Curing of Epoxy Novolac Resin (For Comparative Purposes)

A portion of the resin from Example 9-J, 10.0 grams, was reacted with 2.41 grams of methylenedianiline as described in Example 2-D. The cured resin had a Tg of 302.5 as measured by TMA.

N. Curing of an Epoxy Novolac Resin with a Phenolic Novolac Resin (For Comparative Purposes)

The procedure described in Example 2-I was repeated using the phenolic novolac resin described in Example 9-A. The cured product had a Tg of 166.6° C.

EXAMPLE 10

A. Preparation of Phenol Formaldehyde Novolac Resin

In a manner similar to that described in Example 7-A, 1.61 parts phenol, 1.0 part of formalin (37% formaldehyde) and 0.008 part oxalic acid were reacted to produce a solid novolac resin with a Mettler softening point of 110.7, and a melt viscosity of 1800 cps measured at 150° C. Analysis by GPC showed the wt. avg. M.W. to be 1,729, no. avg. M.W. 927, with a polydispersity of 1.87. The resin contained 9.5% 2-functional product as measured by GPC. The weight ratio of 2-functional to 3-functional components was 1.17:1.

B. Removal of 2-Functional Product

A second portion of the product prepared in Example 7-A was continuously extracted with water at about 95° C. until the 2-functional components were less than 0.5% by weight as determined by GPC. The product had a Mettler softening point of 139.2° C., and a melt viscosity of greater than 10,000 cps at 150° C. The product had a wt. avg. M.w. of 2,001, no. avg. M.W. 1,352, with a polydispersity of 1.48. The weight ratio of 2-functional to 3-functional components was less than 0.25:1.

C. Cure of Epoxy Novolac

The above extracted epoxy novolac (Example 10-B) 35.0 grams was mixed at 150° C. with 6.88 grams of sulfanilamide and 0.2 ml of a 35% solution of tetrabutylphosphonium acetate.acetic acid complex in methanol was added. The homogeneous mixture was molded and cured as described in Example 1-E. The cured casting had a glass transition temperature (Tg) of >250° C. as measured by DSC.

We claim:

1. A product resulting from curing an epoxy resin having an average of more than one vicinal epoxy group per molecule with a curing quantity of a novolac resin prepared from (1) an organic material having at least one aromatic hydroxyl group per molecule selected from the group consisting of (a) phenol and (b) a mixture of phenol and a substituted phenol wherein the substituent groups are hydroxyl, hydrocarbyl or hydrocarbyloxy groups having from 1 to about 9, carbon atoms, or a halogen and wherein more than about 50 mole percent of the mixture is phenol and (2) an aldehyde, said novolac resin having an average functionality of from about 3 to about 6, containing less than about 18 percent of 2-functional component by weight with the proviso that when 2-functional and 3-functional components are both present, they are present in a weight ratio of 2-functional component to 3-functional component of less than about 1.1:1.

2. A product of claim 1 wherein
   (i) said aldehyde is an aliphatic, cycloaliphatic or aromatic aldehyde having from 1 to about 14 carbon atoms;
   (ii) said novolac resin contains less than about 12.5 percent 2-functional component by weight and the weight ratio of 2-functional component to 3-functional component is less than about 0.75:1; and
   (iii) said material having at least one aromatic hydroxyl group per molecule contains more than 70 mole percent phenol.

3. A product of claim 2 wherein
   (i) said aldehyde is formaldehyde;
   (ii) said novolac resin contains less than about 7 percent 2-functional component by weight and the weight ratio of 2-functional component to 3-functional component is less than about 0.5:1; and
   (iii) said material having at least one aromatic hydroxyl group per molecule contains more than 85 mole percent phenol.

4. A product resulting from curing an epoxy resin having an average of more than one vicinal epoxy group per molecule with a curing quantity of a novolac resin prepared from (1) a material having at least one aromatic hydroxyl group per molecule selected from the group consisting of (a) phenol and (b) a mixture of phenol and a substituted phenol wherein the substituent groups are hydroxyl, hydrocarbyl or hydrocarbyloxy groups having from 1 to about 9, carbon atoms, or a halogen and wherein more than about 50 mole percent of the mixture is phenol and (2) an aldehyde; said novolac resin having an average functionality of from about 4 to about 12 and which contains less than about 14 percent of weight 2-functional component; with the proviso that when 2-functional and 3-functional components are both present, the weight ratio of 2-functional component to 3-functional component is less than about 1.1:1.

5. A product of claim 4 wherein
   (i) said aldehyde is an aliphatic, cycloaliphatic or aromatic aldehyde having from 1 to about 14 carbon atoms;
   (ii) said novolac resin contains less than about 9 percent by weight of two functional component with the proviso that when 2-functional component and 3-functional component are both present, the weight ratio of 2-functional component to 3-functional component is less than about 0.75:1; and
   (iii) said material having at least one aromatic hydroxyl group per molecule contains more than 70 mole percent phenol.

6. A product of claim 5 wherein
   (i) said aldehyde is formaldehyde;
   (ii) said novolac resin contains less than about 5 percent by weight of two functional component; with the proviso that when 2-functional component and 3-functional component are both present, the weight ratio of 2-functional component to 3-functional component is less than about 0.5:1; and
   (iii) said material having at least one aromatic hydroxyl group per molecule contains more than 85 mole percent phenol.

7. A product of claim 1, 2, 3, 4, 5, or 6 wherein said epoxy resin is a glycidyl ether of a bisphenol or a glycidyl ether of a novolac resin.

8. A product of claim 7 wherein said epoxy resin is a glycidyl ether of a phenol-formaldehyde novolac resin.

9. A product of claim 1, 2, 3, 4, 5, or 6 which contains a reinforcing material comprising a natural or synthetic fibrous material in filament, mat or woven form.

10. A product of claim 9 wherein said reinforcing material is glass, carbon, graphite or aramid.

11. A product of claim 7 which contains a reinforcing material comprising a natural or synthetic fibrous material in filament, mat or woven form.

12. A product of claim 11 wherein said reinforcing material is glass, carbon, graphite or aramid.

13. A product of claim 8 which contains a reinforcing material comprising a natural or synthetic fibrous material in filament, mat or woven form.

14. A product of claim 13 wherein said reinforcing material is glass, carbon, graphite or aramid.

* * * * *